United States Patent
Kazmierczak

(10) Patent No.: US 6,252,318 B1
(45) Date of Patent: Jun. 26, 2001

(54) DIRECT GAS COOLED LONGITUDINAL/CROSS-FLOW ROTOR ENDWINDING VENTILLATION SCHEME FOR ROTATING MACHINES WITH CONCENTRIC COIL ROTORS

(75) Inventor: Edmund E. Kazmierczak, Schenectady, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/501,147

(22) Filed: Feb. 9, 2000

(51) Int. Cl.⁷ ........................................ H02K 1/32
(52) U.S. Cl. ............... 310/61; 310/260; 310/270
(58) Field of Search ............... 310/61, 59, 65, 310/220, 214, 260

(56) References Cited

U.S. PATENT DOCUMENTS

| | | | |
|---|---|---|---|
| 1,927,890 | 9/1933 | Fechheimer | 310/61 |
| 2,786,951 | 3/1957 | Morgan | 310/61 |
| 2,787,721 | 4/1957 | Tudge | 310/61 |
| 2,833,944 | 5/1958 | Wilyoung | 310/61 |
| 3,225,231 | 12/1965 | Kudlacik | 310/61 |
| 4,031,422 | * 6/1977 | Armor et al. | 310/256 |
| 4,335,324 | 6/1982 | Fujioka et al. | 310/61 |
| 4,543,503 | 9/1985 | Kaminski et al. | 310/59 |
| 4,546,279 | 10/1985 | Hammer et al. | 310/59 |
| 4,709,177 | 11/1987 | Kaminski | 310/59 |
| 4,922,147 | 5/1990 | Sismour et al. | 310/61 |
| 5,644,179 | * 7/1997 | Staub et al. | 310/65 |

FOREIGN PATENT DOCUMENTS

0166990 * 4/1985 (EP) .

OTHER PUBLICATIONS

Alsthom Review No. 7—1987 "300 MW Modular Design Generators."

"Experiend With A Generator Driven By Combustion Turbine", Bernard Guigues, EDF–SEPTEN.

* cited by examiner

Primary Examiner—Joseph Waks
(74) Attorney, Agent, or Firm—Nixon & Vanderhye

(57) ABSTRACT

A cooling gas ventilation circuit is provided for an endwinding of a rotary machine having a rotor and a plurality of coils seated in radial slots provided in the rotor. The coils each comprise a plurality of radially stacked turns, the coils extending beyond a pole face of the rotor to form an endwinding with longitudinal cavities between the coils. A substantially cylindrical baffle ring covers the radially innermost turns of the plurality of coils in the endwinding, and has a plurality of holes therein aligned with at least one of the longitudinal cavities between the coils.

18 Claims, 7 Drawing Sheets

DIRECT GAS COOLED LONGITUDINAL/ CROSS-FLOW ROTOR ENDWINDING VENTILLATION SCHEME FOR ROTATING MACHINES WITH CONCENTRIC COIL ROTORS

BACKGROUND OF THE INVENTION

This invention relates generally to the rotor windings of a dynamo-electric machine, and particularly, to endwinding ventilation schemes for machines with concentric rotor windings.

The rotors in large gas cooled dynamo-electric machines have a rotor body which is typically made from a machined high strength solid iron forging. Axially extending radial slots are machined into the outer periphery of the rotor body at specific circumferential locations to accommodate the rotor winding. The rotor winding in this type of machine typically consists of a number of complete coils, each having many field turns of copper conductors. The coils are seated in the radial slots in a concentric pattern with, for example, two such concentric patterns in a two-pole rotor. The coils are supported in the rotor body slots against centrifugal forces by metallic wedges which bear against machined dovetail surfaces in each slot. The regions of the rotor winding coils which extend beyond the ends (or pole faces) of the main rotor body are called "endwindings" and are supported against centrifugal forces by high strength steel retaining rings. The inboard end of each retaining ring is typically shrunk onto a machined surface at the end of the rotor body. The outboard end of each retaining ring is typically shrunk onto a circular shaped steel member called a centering ring. A section of the rotor shaft forging which is located underneath the rotor endwindings is referred to as the spindle.

Thus, the rotor winding can be separated into two major regions, the rotor body region within the radial slots in the rotor, and the rotor endwinding region that extends beyond the pole face, radially spaced from the rotor spindle. This invention relates primarily to ventilation schemes or circuits for the rotor endwinding region.

In order to reduce costs and machine size, rotating machine manufacturers are continuously seeking methods of obtaining more power output from a given volume of machine. Rotor winding thermal limitations are a major obstacle toward achieving this goal. Accordingly, more effective rotor winding cooling schemes facilitate the manufacturer's ability to achieve the desired higher power output.

Several rotor endwinding cooling approaches have been used in the past. Most of these approaches utilize longitudinally grooved copper windings where cooling gas enters the field turns from an open cavity via inlet ports at the sides of the turns, and then flows longitudinally along the grooves to discharge locations which are typically either chimneys in the rotor body or discrete baffled discharge zones under and around the endwinding. The gas in these baffled zones is typically discharged either to the air gap (i.e., the gap between the rotor and stator) via machine slots in the pole face, or to the area outside of the centering ring via openings in the centering ring. Some schemes utilize discharges through radial holes in the retaining rings.

BRIEF SUMMARY OF THE INVENTION

This invention provides a new direct gas cooled rotor endwinding ventilation scheme for machines with concentric rotor windings. A typical application is for round rotor turbine driven generators.

The present invention utilizes a non-metallic baffle ring on each end of the machine, completely covering the radially inner surfaces of the respective rotor endwindings and segregating the rotor body ventilation regions of the windings from the rotor endwinding ventilation regions of the windings. Since the endwindings at opposite ends of the rotor are identical, only one will be described herein.

Carefully located radial holes are formed in the baffle ring that allow the entrance of cooling gas through the baffle ring to the rotor endwinding. The holes are located so as to communicate with the longitudinal inlet cavities between certain of the coils in the endwinding region. As a result, cooling gas flows radially through the holes in the baffle ring and into longitudinal inlet cavities. It is to be noted that for any given coil of interest, a longitudinal inlet cavity is located on only one side of that coil in the rotor endwinding.

A certain number of the copper field turns of the coil of interest have longitudinal grooves machined along the length of the turns. The grooves are of various lengths and can be of different sizes, i.e., cross sections. At the beginning or upstream end of each groove, a lateral groove inlet port is machined in the turn between the groove and the side of the turn adjacent the longitudinal inlet cavity. At the downstream end of the groove, a lateral groove exit port is machined in the turn from the groove to the outer edge of the turn on the opposite side of the turn. Cooling gas can thus flow from the longitudinal inlet cavity into the copper turns via the groove inlet ports, then through the longitudinal grooves and finally through the lateral groove exit ports where the gas discharges into a longitudinal outlet cavity on the opposite side of the coil of interest.

Vent holes or slots are machined in the steel teeth at the end of the rotor body. Thus, cooling gas discharged from the coil can now flow via the longitudinal cavities through the tooth vent slots and discharge into the machine's air gap. In addition, one or more of the coils may have turns with longitudinal grooves extending into the rotor body to permit an alternative gas discharge circuit where the cooling gas exits via radial chimneys in the windings themselves, along and within the rotor body.

Any inter-coil spacer blocks in the longitudinal cavities (used to maintain adjacent windings in predetermined spaced relationship) that are obstructing cooling flow can be provided with vent passages that allow the cooling gas to flow through the spacer blocks. Another alternative is to bypass the spacer blocks via internal grooves machined along the field turns to suitable exit ports on the far side of the spacer block. Other bypass schemes may be devised as well. One example is to design bypass passages into the baffle ring design.

In still another variation, to further increase the cooling gas discharge area in the endwinding, the baffle ring may be modified to provide an additional axial gas flow passage to distribute gas to slots machined in the rotor pole faces or to radial holes in the centering ring via the longitudinal cavity in the center of the coils. In other words, additional holes in the baffle ring are aligned with the space at the center of a group of concentrically arranged coils, and one or more discharge slots are provided in the pole face, opening into the longitudinal cavity and discharging into the air gap. Axially extending baffle plates are used to channel cooling gas axially into the area of the modified baffle ring holes so that gas flowing radially inwardly from the longitudinal cavities through the discharge holes in the sleeve-like baffle ring, flows axially between the baffle plates and discharges into the pole face discharge slots or into the discharge holes in the centering ring, or both.

With the rotor endwinding ventilation schemes in accordance with this invention, many new ventilation arrangements are possible, such as using multiple side-by-side ducts, multiple staggered ducts, and diagonal flow passages, which then also opens up the possibility for counterflow schemes that reduce and provide more uniform rotor endwinding temperatures. The cooling schemes disclosed herein also make full use of the space on each side of the coil of interest as ventilating gas flowpaths, and for convection cooling of the outer surfaces of the field turns of the coils.

With the rotor endwinding ventilation schemes in accordance with the invention, several advantages may be realized:

a) Improved ventilation via direct gas cooling in which hot spot and average winding temperatures are reduced;

b) More uniform temperatures throughout the endwinding;

c) Ability to provide many short length cooling passages in direct contact with the copper field turns, thereby limiting cooling gas temperature rise;

d) Ability to devise many ventilation patterns including counterflow ventilation schemes;

e) Relatively simple manufacturing complexity compared to other schemes; and f) Reduced machine volume for a given output rating.

Accordingly, in its broader aspects, the invention relates to a cooling gas ventilation circuit for an endwinding of a rotary machine having a rotor and a plurality of coils seated in radial slots provided in the rotor, the coils each comprising a plurality of radially stacked turns, the coils extending beyond a pole face of the rotor to form an endwinding with longitudinal cavities between the coils; a substantially cylindrical baffle ring covering radially innermost turns of the plurality of coils in the endwinding, the baffle ring having a plurality of holes therein aligned with at least one of the longitudinal cavities between the coils.

DETAILED DESCRIPTION OF THE INVENTION

Figure 1:
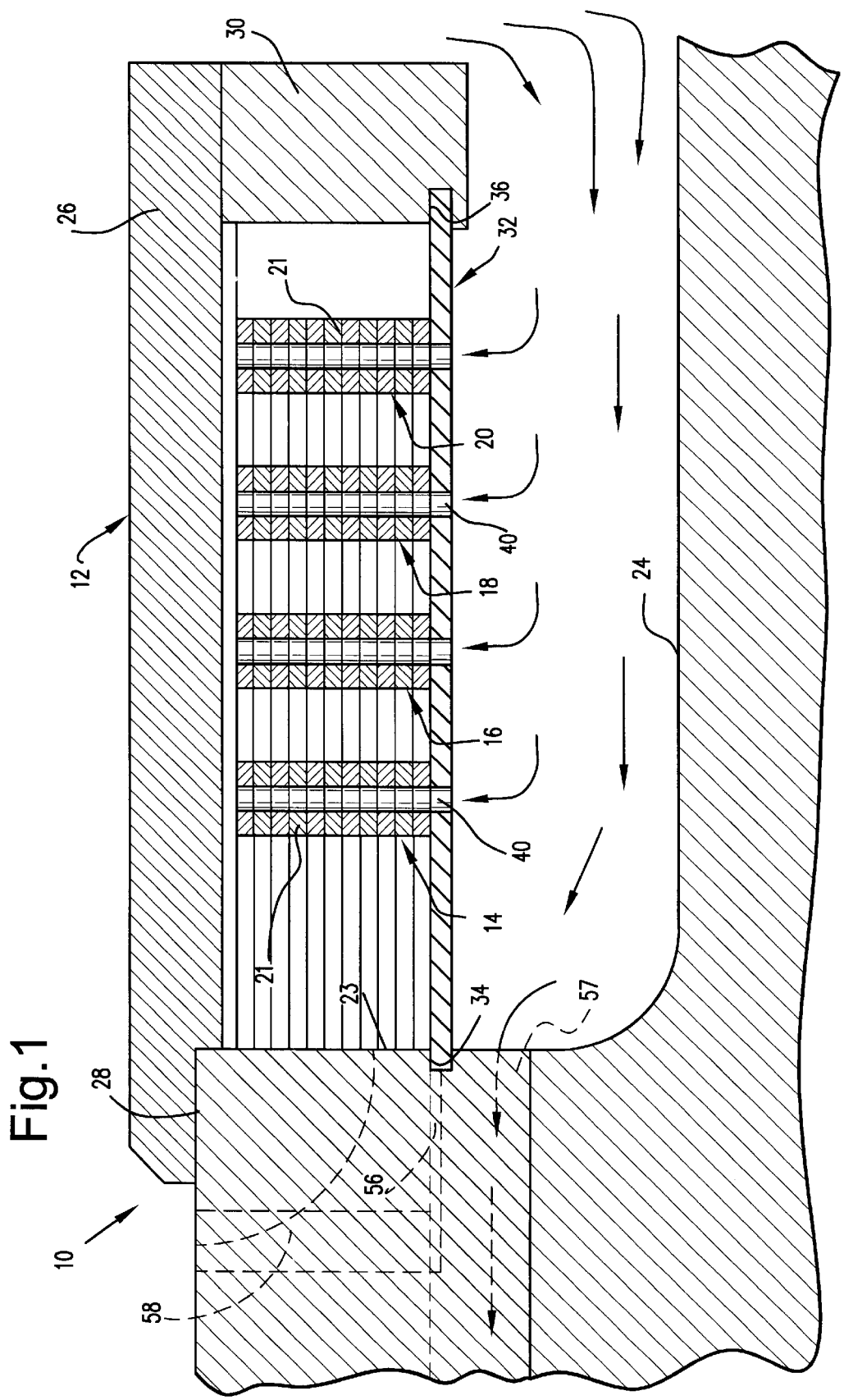
FIG. 1 is a partial radial section of one end of a machine rotor.

With reference to FIG. 1, one end of a rotor body 10 is illustrated with a rotor endwinding 12 extending beyond one end of the rotor body. The rotor endwinding includes the end region of a number of complete coils 14, 16, 18 and 20 in a concentric, generally rectangular configuration. For a two pole rotor, two such concentric sets of coils are arranged on opposite sides of the rotor. The invention is applicable, however, to other rotor configurations as well. Each coil includes many field turns 21 of copper conductors in a stacked configuration. This invention can be applied to windings where the individual turns are made up of multiple layers of conductors as well as just single conductors. These coils are nested within the radial slots 22 machined into the outer periphery of the rotor body, with the endwindings extending axially beyond the pole face 23 of the rotor body at both ends of the machine in conventional fashion. A spindle portion 24 of the rotor extends in an axial direction, radially inward of the endwinding. The coils 14, 16, 18 and 20 are supported in the slots 22 of the rotor body against centrifugal forces by metallic wedges (not shown) which bear against machined dovetail surfaces (not shown) in each rotor coil slot. The endwinding is supported against centrifugal forces by a high strength, annular steel retaining ring 26. The inboard end of each retaining ring is shrunk onto a machined surface 28 of the rotor body, while the outboard end of the retaining ring 26 is shrunk onto a circular shaped steel member or centering ring 30. The rotor winding is electrically insulated from the rotor body and retaining ring via appropriate ground insulation. In addition, the turns which make up the coils of the rotor winding are electrically insulated against each other via appropriate turn-to-turn insulation. For the sake of simplicity, the insulation is not shown in the drawings. Note also that in FIG. 2, one half of the endwinding 12 is shown in simplified form. Spacer blocks that are normally present in the endwinding to separate the coils 14, 16, 18 and 20 have been eliminated for clarity.

A cylindrical sleeve-like baffle ring 32 is installed underneath the concentric rotor endwinding 12 to separate the endwinding ventilation region from the rotor body ventilation region of the rotor. The rotor endwinding is thus completely enclosed by the rotor body 10, the retaining ring 26, the centering ring 30 and the baffle ring 32. The baffle ring 32 is preferably constructed of non-metallic material and may be a full 360° ring, or may be formed as several arcuate segments with overlapping joints.

The baffle ring 32 may be captured in grooves 34 and 36 machined in the end of the rotor body 10 and the centering ring 30, but other assembly and mounting techniques may be employed. For example, the baffle ring 32 could be supported by a plurality of spokes (four preferred) radially extending between the spindle 24 and the baffle ring 32 at 90° intervals, or by any other suitable means as would be appreciated by one of ordinary skill in the art.

Figure 2:
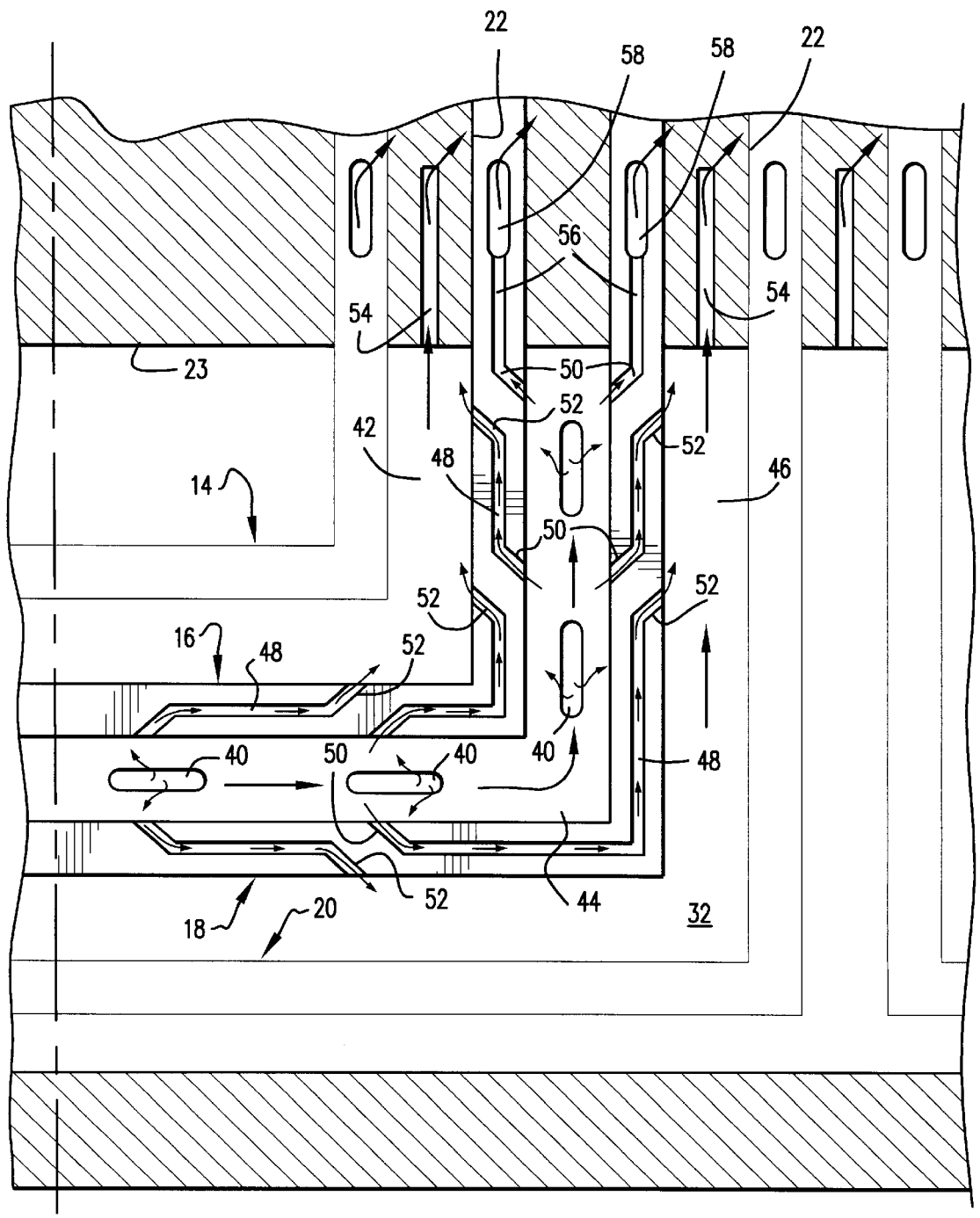
FIG. 2 is a partial top plan view, partially sectioned, of the coils of a rotor endwinding at one end of the rotor.
Figure 3:
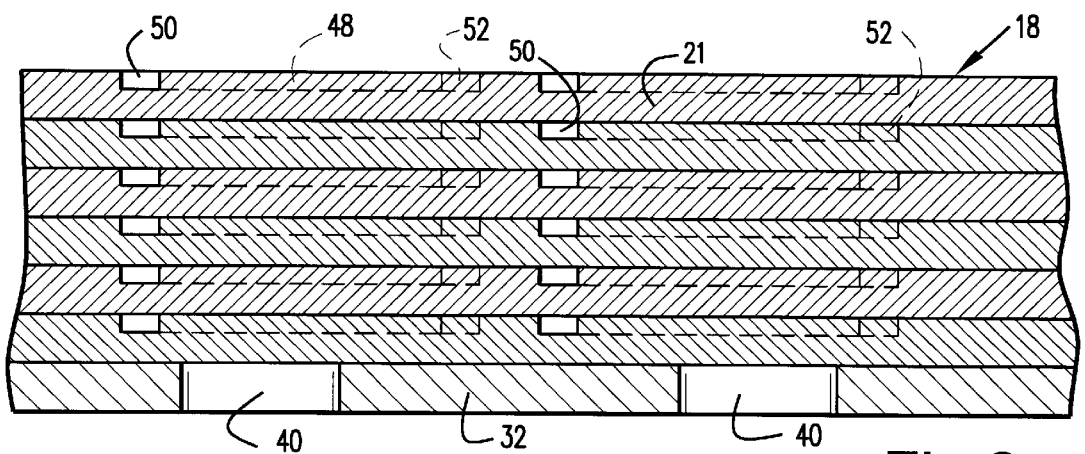
FIG. 3 is a partial side section taken through one of the coils in the rotor endwinding shown in FIG. 2.

With reference also to FIGS. 2 and 3, the baffle ring has oblong holes 40 machined or molded into the ring at specifically identified locations. The purpose of these holes is to feed the cooling gas which flows axially between the inside diameter of the baffle ring 32 and the rotor spindle 24 into longitudinal inlet cavities located between certain coils (16 and 18) in the rotor endwinding region. In the exemplary embodiment, only one inlet cavity 44 is shown, between adjacent sides of coils 16, 18. Cavities 42 and 46 on the opposite sides of coils 16 and 18 are referred to as discharge cavities as further explained below.

A certain number of the turns 21 (determined by specific application) in the coil of interest (in this case, coil 16 or 18) have longitudinal grooves 48 machined in them of various lengths and sizes. The lengths and sizes (i.e., cross sectional areas of the grooves) can be selected to insure that cooling gas flow distribution is adequate for effective cooling of each turn in the section of the winding of interest. One end of each longitudinal groove is connected to the longitudinal inlet cavity 44 on one side of the turn 16 and 18 via a lateral inlet port 50 machined in the turn so that cooling gas can flow from the longitudinal inlet cavity 44 on one side of the turns of coils 16 and 18 into and along the longitudinal grooves 48 within the turns. At the opposite end of the longitudinal grooves, a lateral exit port 52 is machined in the turns extending from the grooves 48 to the outer edge of the respective turn on the opposite sides of the turns. Cooling gas can thus flow through the longitudinal inlet cavity 44 into the copper turns of coils 16 and 18 via the inlet ports 50 and then flow longitudinally along the grooves 48, then through the lateral exit ports 52 and discharge into discharge cavity 42 formed on the opposite side of coil 16 and discharge cavity 46 on the opposite side of coil 18. The number of turns 21 formed with the above described flow paths and the number of flow paths per turn are variable depending on cooling requirements.

Vent slots or holes 54 are machined in the rotor body teeth (those portions of the rotor between the radial slots) to allow the cooling gas to flow from the longitudinal discharge cavities 42 and 46 into the slots or holes 54 in the rotor teeth to the air gap of the machine. As previously noted, the air gap is the annular space between the machine's stator and rotor.

The lateral inlet ports 50 nearest the rotor body can be used to feed the cooling gas into short grooves 56 machined along the copper turns of coils 16 and 18 which discharge into radial or generally radial chimneys 58 which exit into the machine air gap, thus cooling the winding's transition section from the endwinding region to the rotor body region. Note that cooling gas which does not flow through the baffle ring holes 40, will flow into sub-lots 57 in the rotor body and, in one possible rotor body ventilation scheme, will discharge through radial chimneys (not shown) in the rotor body. Also note that groove 56 and chimney 58 do not communicate with the sub-slot 57.

Figure 4:
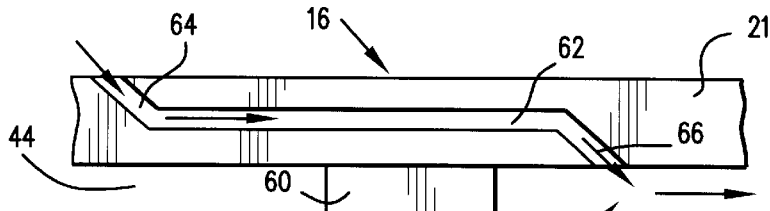
FIGS. 4 and 5 are partial plan views, partially sectioned, of rotor endwinding turns illustrating alternative arrangements for bypassing flow around or through spacer blocks.
Figure 5:
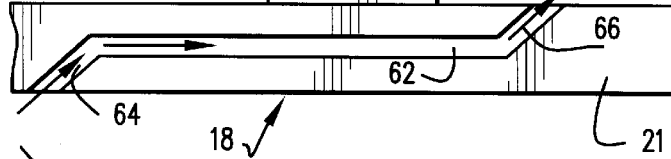

When the machine is running at rated speed, the pumping head of the machine's rotor drives cooling gas flow through the passages. With reference to FIG. 4, any obstacle which is in the cooling gas flow path (specifically the longitudinal cavities 42, 44 and 46 between the turns 21 of coils 16 and 18), such as a rotor endwinding spacer block 60, can be bypassed via grooves 62 machined along the copper turn from inlet ports 64 to suitable exit ports 66 on the far side of the obstacle. Alternatively, one or more holes 68 can be formed in the spacer 70 itself to allow the gas to flow through the obstacle (see FIG. 5). Another possibility is to use spacer block bypass schemes via bypass pockets in the baffle ring design.

Figure 6:
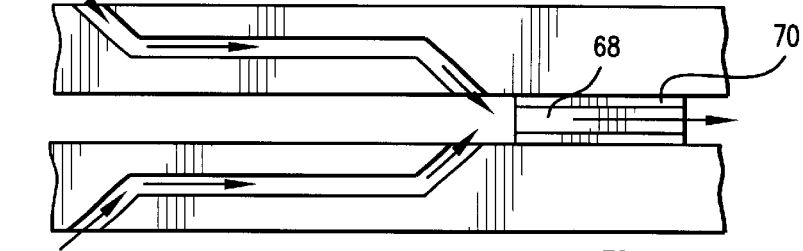
FIG. 6 is a partial plan view of an endwinding turn illustrating multiple side-by-side flow paths.

The invention is not limited to single groove configurations as described above. Rather, multiple groove configurations are also contemplated. In FIG. 6, the one or more turns 72 within a coil may include side-by-side grooves 74, 76 with corresponding inlets 78, 80, and outlets 82, 84 may be used to increase the cooling capacity. In the above arrangement, the inlets and outlets may be combined separately, so that a single large inlet feeds two parallel grooves while a single large outlet discharges gas from those individual grooves.

Figure 7:
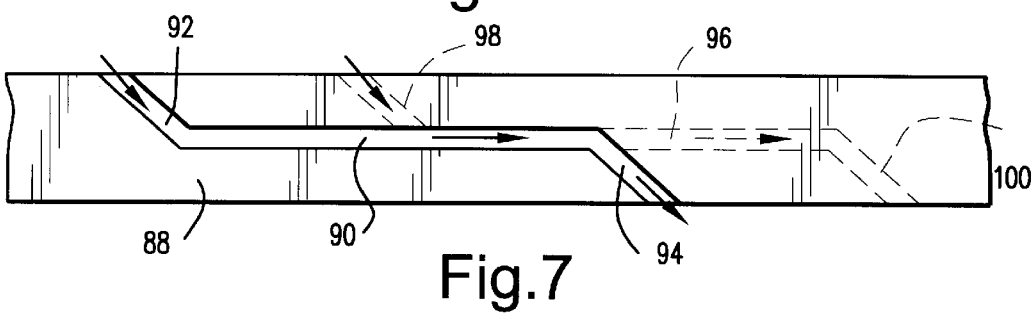
FIG. 7 is a partial plan view of an endwinding turn illustrating staggered flow paths in vertically stacked turns.

With reference to FIG. 7, for any pair of vertically stacked turns, the grooves may be staggered. Thus, in the upper surface of turn 88, a groove 90 is formed with an inlet 92 and an outlet 94. The bottom surface of that same turn may be formed with a groove 96 having an inlet 98 and an outlet 100, in axially staggered relationship. Rather than have a pair of grooves in the upper and lower surface of the same turn, however, it will be appreciated that the staggered grooves may be provided in adjacent or in vertically spaced turns.

Figure 8:
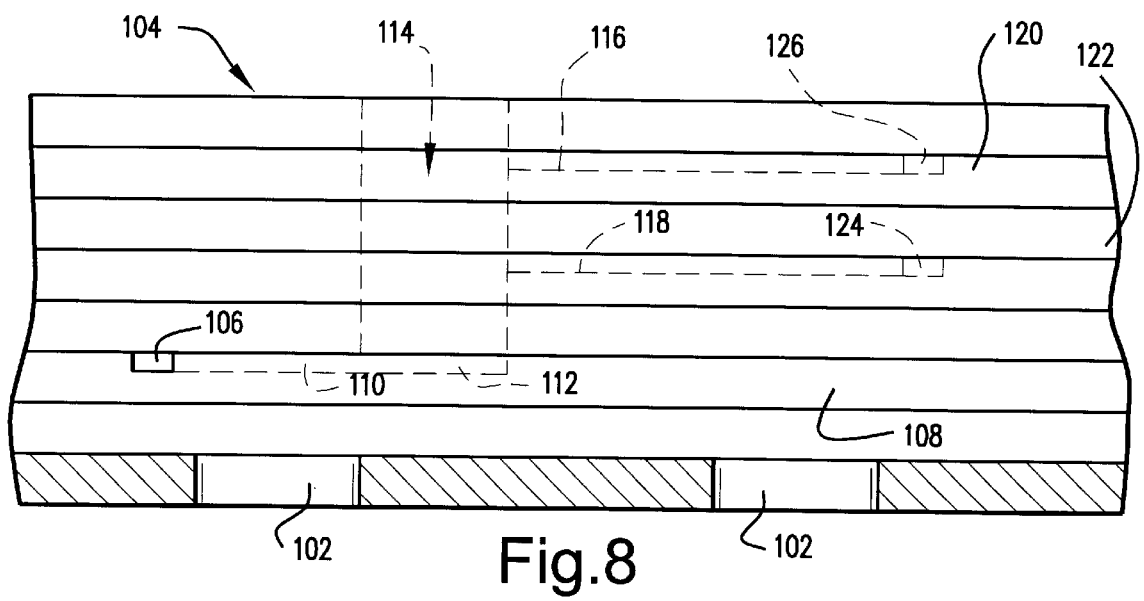
FIG. 8 is a partial side section through several turns in a coil, illustrating a ventilation flow path in accordance with an alternative embodiment of the invention.

It is also within the scope of this invention to introduce radial ducts at various locations within the turns to interconnect grooves and thus form longitudinal/radial ventilation passages. Many combinations of these various longitudinal and radial ventilation passage schemes are possible if, for example, different radial ducts or passages feed the longitudinal grooves (of various lengths) in the areas with exit ports out the sides of the turns, or out the sides of other radial passages, as illustrated for example in FIG. 8. Specifically, cooling gas from baffle ring holes 102 enters a longitudinal inlet cavity on the near side of a coil 104. Some of the gas will enter a lateral port 106 in turn 108 and travel along a longitudinal groove 110 which has an exit port 112 communicating with a radial passage 114 machined into the stack of turns of coil 104. Other longitudinal grooves 116, 118 in turns 120, 122 communicate with the radial passage 114 with additional outlets 124, 126 on opposite sides of the coil 104 communicating with a discharge cavity (not shown) on the far side of the coil. The longitudinal grooves can be machined on either side of the various turns, and for multiple conductor-per-turn windings, the grooves can be machined on the overlapping surfaces of the mating conductors.

Figure 9:
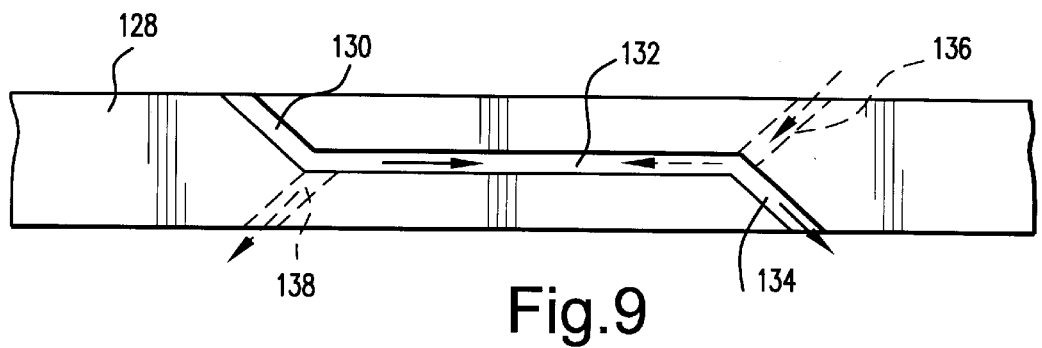
FIG. 9 is a partial plan view illustrating a counterflow ventilation scheme in vertically stacked turns.

Counterflow ventilation schemes in which, for a given region of the coil, cooling gas flows in separate passages in opposite directions with opposite inlet and exit locations are also contemplated. Such an arrangement is shown in FIG. 9 where cooling gas flows in opposite directions in two adjacent stacked turns. In the upper turn 128, cooling gas will flow into inlet 130, through a longitudinal groove 132 and out the outlet port 134 on the opposite side of the turn. At the same time, cooling gas will enter an inlet port 136 in the underlying turn, travel along a groove (not visible in Figure ) in an opposite direction, and exit the outlet port 138 on the opposite side of the coil. A similar arrangement may be achieved with staggered lateral inlet and exit ports. Counterflow schemes have not been done in rotor end windings prior to this invention, and the advantage of counterflow is that both lower and more uniform temperatures can be achieved in the rotor endwinding as compared to non-counterflow schemes.

Figure 10:
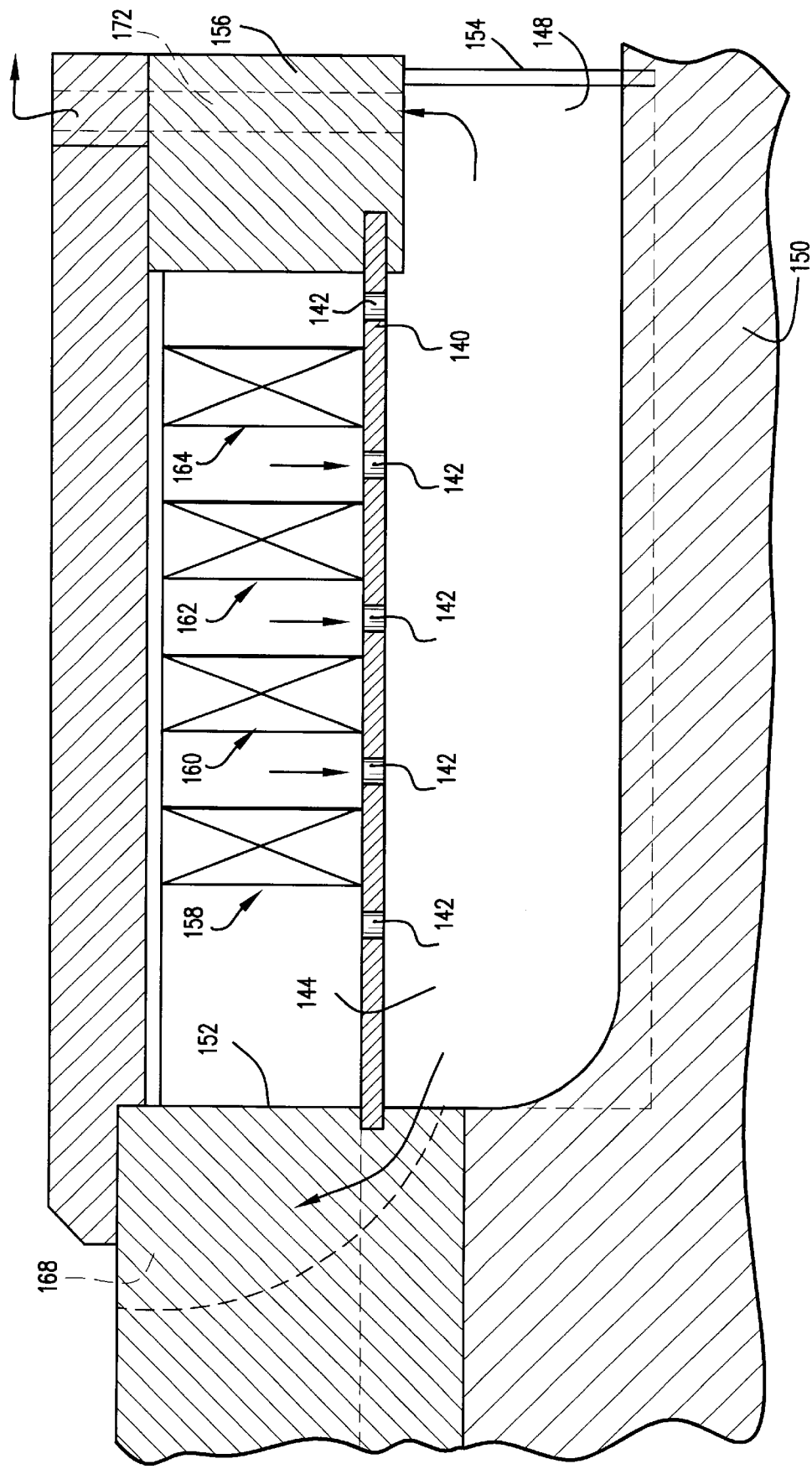
FIG. 10 is a partial radial section through a modified end of a machine rotor.
Figure 11:
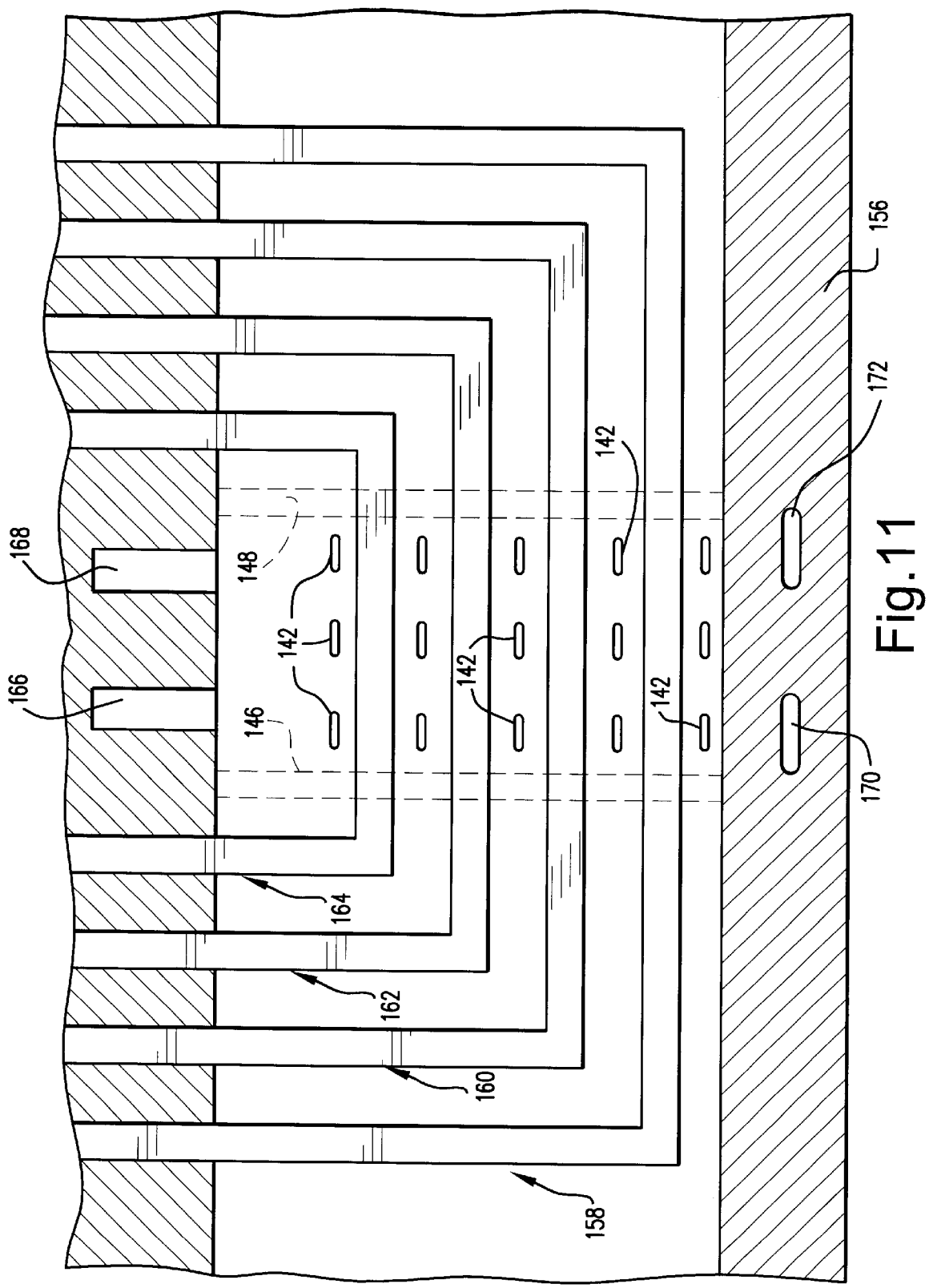
FIG. 11 is a top plan view, partially sectioned, of a two pole rotor incorporating the endwinding ventilation scheme of FIG. 10.
Figure 12:
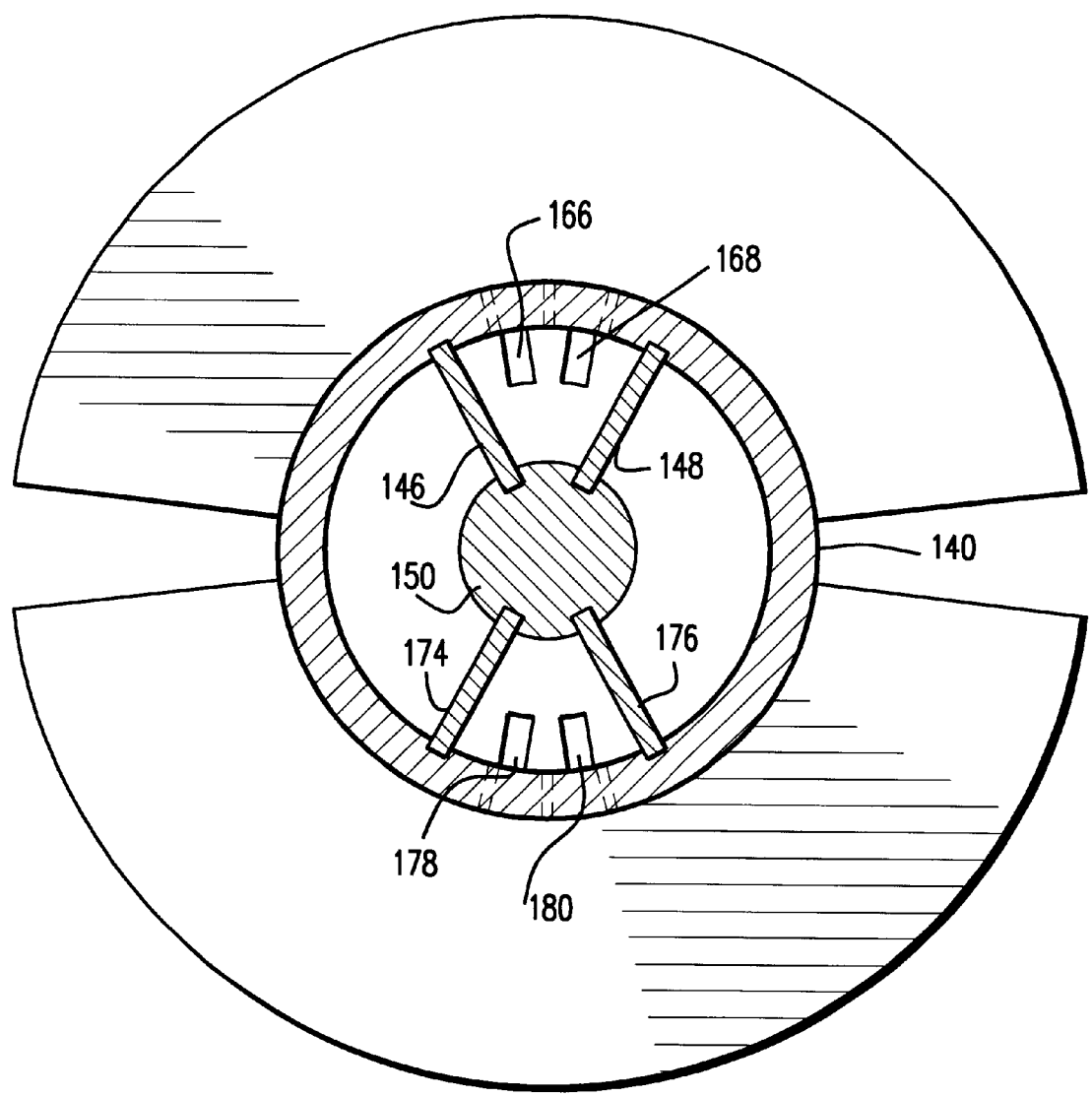
FIG. 12 is a simplified end view of the rotor endwinding shown in FIGS. 10 and 11, but also illustrating the lower half of the rotor.

With reference now to FIGS. 10–12, a ventilation scheme is illustrated for applications where additional cooling gas discharge area may be required in the rotor endwinding region. Here, the baffle ring 140 is modified to include additional holes 142 opening into an axial cavity or passage 144 in the center of the concentric coil arrangement. The center cavity is further defined by radial plates 146, 148 between the baffle ring 140 and the spindle 150 and extending axially between the rotor body or pole face 152 and a semi-annular end cover 154 (FIG. 10) located radially between the spindle 150 and the centering ring 156. As will be appreciated from FIGS. 10 and 11, the holes 142 in the baffle ring 140 are located to open into the spaces between the coils 158, 160, 162 and 164, and between the plates 146, 148.

In this arrangement, cooling gas exiting the ports in the turns of the coils passes through the radial holes 142 in a radially inward direction from the spaces or cavities between the coils into the axial passage defined by plates 146, 148 below the baffle ring 140. The cooling gas can then flow axially in either direction, and can be discharged either into the air gap via vent slots 166, 168 machined into the pole face 152, or into the outside diameter of the centering ring 156 via discharge holes 170,172 forming radial (or generally radial) chimneys in the centering ring. Note that FIG. 14 illustrates the position of additional baffle plates 174,176 and vent slots 178, 180 for the opposite endwinding in a two pole rotor. The schemes can be used for machines with more than two poles by adding additional radial plates for each pole.

The centering ring discharge and pole face slot discharge scheme can be used independently or together, and can be combined with the ventilation schemes previously described to create as much discharge area as practical. The pole face discharge should work well for forward-flow and reverse-flow ventilated machines, while the centering ring discharge works best with forward-flow ventilated machines.

The ventilation schemes in accordance with the invention can be used on any machine with a concentric wound field winding of suitable turn dimensions with square cornered and/or C-shaped corner construction. This can most readily be applied to two-pole and four-pole round rotor turbine driven generators. The ventilation schemes described herein can be applied to machines with either forward or reverse flow ventilation arrangements. The cooling of the rotor body itself can be achieved by an compatible method such as radial cooling (or axial/radial cooling) by means of cooling gas fed from sub-slots machined under the main coil slots in the rotor body, or any gap pickup body cooling scheme where cooling gas enters and discharges from the machine's air gap.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling gas ventilation circuit for an endwinding of a rotary machine having a rotor and a plurality of coils seated in radial slots provided in said rotor, said coils each comprising a plurality of radially stacked turns, said coils extending beyond a pole face of the rotor to form an endwinding with longitudinal cavities between said coils; a substantially cylindrical baffle ring covering radially innermost turns of said plurality of coils in said endwinding, said baffle ring having a plurality of holes therein aligned with at least one of said longitudinal cavities between said coils.

2. The cooling gas ventilation circuit of claim 1 wherein said coils in said endwinding are supported on radially outermost surfaces by a retaining ring, and wherein said coils are enclosed by said baffle ring, said retaining ring and a centering ring extending radially between said baffle ring and said retaining ring.

3. The cooling gas ventilation circuit of claim 2 wherein said rotor is formed with vent slots extending from said pole face in areas of said rotor between said radial slots in which said coils are seated.

4. The cooling gas ventilation circuit of claim 3 wherein one or more turns in at least one of said coils is formed with a flow path comprising inlet ports communicating with said at least one longitudinal cavity, said one or more turns having outlet ports connected to said inlet ports via longitudinal grooves in said one or more turns.

5. The cooling gas ventilation circuit of claim 4 wherein said inlet ports and said outlet ports are on opposite sides, respectively, of said one or more turns.

6. The cooling gas ventilation circuit of claim 5 wherein said outlet ports of said one or more turns in said stack of turns communicate with said longitudinal grooves in other of said one or more turns by a radial passage in said stack of turns.

7. The cooling gas ventilation circuit of claim 4 wherein each of said one or more turns is formed with a plurality of said inlet ports, exit ports and longitudinal grooves.

8. The cooling gas ventilation circuit of claim 4 wherein a pair of adjacent turns in said plurality of radially stacked turns in at least one of said plurality of coils have at least a pair of said flow paths arranged to cause flow in opposite directions.

9. The cooling gas ventilation circuit of claim 4 wherein said flow paths are staggered along a length dimension of said turns.

10. The cooling gas ventilation circuit of claim 1 wherein one or more spacer blocks are inserted between said plurality of coils, and wherein means are provided for bypassing cooling gas around or through said spacer blocks.

11. The cooling gas ventilation circuit of claim 1 and including axially extending plates radially between said baffle ring and a spindle portion of said rotor; said axially extending plates providing a cooling gas discharge channel communicating at one end thereof with a gas discharge slot in said rotor.

12. The cooling gas ventilation circuit of claim 2 and including axially extending plates radially between said baffle ring and a spindle portion of said rotor; said axially extending plates providing a cooling gas discharge channel communicating at an opposite end with a generally radial chimney extending through said centering ring.

13. The cooling gas ventilation circuit of claim 1 wherein each of said turns is comprised of one or more layers of conductors.

14. A cooling gas ventilation circuit for an endwinding of a rotary machine having a rotor and a plurality of coils seated in radial slots provided in said rotor, said coils each comprising a plurality of radially stacked turns, said coils extending beyond a pole face of the rotor to form an endwinding with longitudinal cavities between said coils; a substantially cylindrical baffle ring covering radially innermost turns of said plurality of coils in said endwinding, said baffle ring having a plurality of holes therein aligned with at least one of said longitudinal cavities between said coils; wherein said coils in said endwinding are supported on radially outermost surfaces by a retaining ring, and wherein said coils are enclosed by said baffle ring, said retaining ring and a centering ring extending radially between said baffle ring and said retaining ring; and further including at least a pair of axially extending baffle plates radially between said baffle ring and a spindle portion of said rotor; said axially extending plates providing a cooling gas discharge channel communicating at one end thereof with a gas discharge slot in said rotor.

15. The cooling gas ventilation circuit of claim 14 wherein said cooling gas discharge channel communicates at an opposite end with a generally radial chimney in said centering ring.

16. The cooling gas ventilation circuit of claim 15 wherein one or more turns in at least one of said coils is formed with a flow path comprising inlet ports communicating with said at least one longitudinal cavity, said one or more turns having outlet ports connected to said inlet ports via longitudinal grooves in said one or more turns.

17. The cooling gas ventilation circuit of claim 16 wherein said inlet ports and said outlet ports are on opposite sides, respectively, of said one or more turns.

18. The cooling gas ventilation circuit of claim 14 wherein each of said turns is comprised of one or more layers of conductors.

* * * * *

UNITED STATES PATENT AND TRADEMARK OFFICE
CERTIFICATE OF CORRECTION

PATENT NO.    : 6,252,318 B1  Page 1 of 1
DATED         : June 26, 2001
INVENTOR(S)   : Kazmierczak It is certified that error appears in the above-identified patent and that said Letters Patent is hereby corrected as shown below:

Column 5,
Lines 40, 28 and 29, delete "sub-lots" and insert -- sub-slots --.

Signed and Sealed this

Fourth Day of June, 2002

Attest:

Attesting Officer

JAMES E. ROGAN
*Director of the United States Patent and Trademark Office*